United States Patent [19]

Kubo et al.

[11] Patent Number: 5,362,375
[45] Date of Patent: Nov. 8, 1994

[54] OIL COMPOSITIONS

[75] Inventors: Junichi Kubo; Osamu Kato, both of Yokohama, Japan

[73] Assignee: Nippon Oil Co., Ltd., Japan

[21] Appl. No.: 689,278

[22] PCT Filed: Oct. 4, 1990

[86] PCT No.: PCT/JP90/01288

§ 371 Date: Jun. 5, 1991

§ 102(e) Date: Jun. 5, 1991

[87] PCT Pub. No.: WO91/05032

PCT Pub. Date: Apr. 18, 1991

[30] Foreign Application Priority Data

Oct. 5, 1989 [JP] Japan ................................. 1-261194

[51] Int. Cl.$^5$ .......................................... C10M 105/06
[52] U.S. Cl. ........................................ 208/19; 208/18; 208/16; 252/49.6; 252/56 S; 252/56 R; 252/50; 585/6.6; 585/13; 585/14
[58] Field of Search ............... 208/14, 18, 19; 585/13, 585/6.3, 6.6; 252/49.6, 56 S, 56 R, 50

[56] References Cited

U.S. PATENT DOCUMENTS

| | | | |
|---|---|---|---|
| 3,506,565 | 4/1970 | White et al. | 208/19 |
| 3,617,473 | 11/1971 | Lipscomb | 208/14 |
| 3,625,878 | 12/1971 | Gourlauen | 208/14 |
| 3,977,964 | 8/1976 | Schieman | 208/19 |
| 4,213,845 | 7/1980 | Masada | 208/18 |
| 4,324,155 | 4/1982 | Kimura et al. | 208/14 |
| 4,513,155 | 4/1985 | Tamura et al. | 585/13 |
| 4,755,275 | 7/1988 | Sato et al. | 208/14 |
| 5,015,404 | 5/1991 | Kubo et al. | 208/19 |
| 5,049,257 | 9/1991 | Furukawa | 208/14 |

*Primary Examiner*—Helane Myers
*Attorney, Agent, or Firm*—Bruce L. Adams; Van C. Wilks

[57] ABSTRACT

Oil compositions are disclosed which are substantially undeteriorative even in an oxidizing atmosphere and suitably applicable as lubricating oils, heat transfer oils, heat treating oils and electrical discharge machining oils. The composition is essentially comprised of 100 weight parts of a selected base oil of a mineral or synthetic class and 0.1 to 20 weight parts of a specified oil fraction. The oil fraction is an oil generated from a hydrogenated pitch and distilled to boil at from 160° to 550° C., the pitch being derived by primarily heat-treating and hydrogenating a heavy oil of a petroleum or coal origin, or an oil resulting from secondarily heat-treating the pitch and boiling at from 160° to 550° C.

10 Claims, 3 Drawing Sheets

OIL COMPOSITIONS

TECHNICAL FIELD

This invention relates to oil compositions and more particularly to such a composition which is substantially free from thermal deterioration and carbonaceous deposition at high temperatures and sufficiently undeteriorative even in oxidizing atmospheres. The oil composition is suitable for use as a lubricating oil, heat transfer oil, heat treating oil, electrical discharge machining oil or the like.

BACKGROUND ART

Lubricating oils, heat transfer oils, heat treating oils and electrical discharge machining oils find extensive application in various sectors of industry. Great concern, however, has aroused as these prior art oils tend to get deteriorated upon exposure to heating and oxidizing environments.

The above character of oil is liable to thermally deteriorate with carbonaceous deposits and also with sludge precipitates in some cases because it is often subject to high temperature. Moreover, it oxidatively denatures and deteriorates with the results that acidic material will develop, thus causing metal corrosion and that oxide material will polycondensate, resulting in sludge deposition. In an effort to eliminate the tendency of the oil becoming thermally and oxidatively deteriorative, a number of antioxidants have been proposed which however are all encountered with something poor or defective. No antioxidants are known to have capabilities for all practical purposes.

Deterioration of the foregoing oil will in most instances take place as a result of both heating and oxidizing factors becoming tangled rather than either one of the factors. Those known antioxidants suffer from too low a magnitude of heat resistance to warrant application at elevated temperature.

DISCLOSURE OF THE INVENTION

The present invention seeks to provide an oil composition which excels in oxidative stability with carbonaceous matter held to an absolute minimum.

Research efforts have been made to arrive at the invention based on the finding that oil compositions when blended with a certain specific type of oil fractionate can be inhibited from being thermally and oxidatively deteriorated. This fractionate is an oil generating from a hydrogenated pitch and boiling at from 160° to 550° C., the pitch being obtained by primarily heat-treating and hydrogenating a heavy oil of a petroleum or coal origin, or an oil resulting from secondarily heat-treating the pitch and boiling at from 160° to 550° C. The resulting hydrogenated pitch is highly hydrogen-donative in nature.

In one aspect the invention provides an oil composition comprising: (a) 100 parts by weight of at least one base oil of a mineral or synthetic class and (b) 0.1 to 20 parts by weight of an oil fraction generated from a hydrogenated pitch and distilled to boil at from 160° to 550° C., the pitch being derived by primarily heat-treating and hydrogenating a heavy oil of a petroleum or coal origin, or an oil fraction resulting from secondarily heat-treating the pitch and boiling at from 160° to 550° C.

In another aspect the invention provides an oil composition comprising: (a) 100 parts by weight of at least one base oil of a mineral or synthetic class, (b) 0.1 to 20 parts by weight of an oil fraction generated from a hydrogenated pitch and distilled to boil at from 160° to 550° C., the pitch being derived by primarily heat-treating and hydrogenating a heavy oil of a petroleum or coal origin, or an oil fraction resulting from secondarily heat-treating the pitch and boiling at from 160° to 550° C. and (c) a gelling agent.

BEST MODE OF CARRYING OUT THE INVENTION

Figure 1:
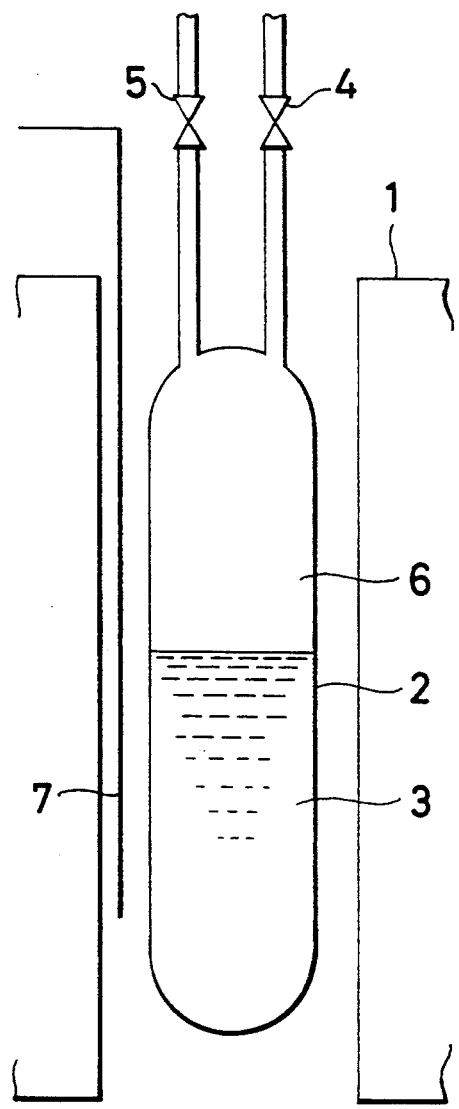
FIGS. 1 to 3 are diagrammatical representations of certain apparatus employed to test the oil composition of the present invention, FIG. 1 being directed to a heat stability tester used in Inventive Example 1, FIG. 2 to a panel coking tester used in Inventive Example 2 and FIG. 3 to an electrical discharge machining apparatus used in Inventive Example 3.

Base oils as components (a) eligible for purposes of the present invention are those of a mineral or synthetic class and in common use for lubricating oils, heat transfer oils, heat treating oils and electrical discharge machining oils.

Mineral base oils may be chosen from one or more fractionates generated from refining oil cuts as by solvent deasphaltation, solvent extraction, hydrocracking, solvent dewaxing, sulfuric acid treatment, clay treatment and hydrorefining in combination, which cuts are induced by atmospheric or vacuum distillation of crude oil. Synthetic base oils include α-olefin oligomers such as normal paraffin, isoparaffin, polybutene, 1-decene oligomer and the like, alkylbenzenes such as monoalkylbenzene, dialkylbenzene, polyalkylbenzene and the like, alkylnaphthalenes such as monoalkylnaphthalene, dialkylnaphthalene, polyalkylnaphthalene and the like, diesters such as di-2-ethylhexyl sebacate, dioctyl adipate, diisodecyl adipate, ditridecyl adipate, ditridecyl glutarate and the like, polyol esters such as trimethylolpropane caprylate, trimethylolpropane pelargonate, pentaerythritol-2-ethyl hexanoate, pentaerythritol pelargonate and the like, polyglycols such as polyethylene glycol, polypropylene glycol, polypropylene glycol monoether and the like, polyphenyl ethers, tricresyl phosphates and silicone oils either alone or in combination.

These base oils, mineral and synthetic, may be admixed where desired in the practice of the invention.

The base oil according to the invention may preferably have a kinematic viscosity of 10 to 500 cst at 40° C. for use in a lubricating oil, heat transfer or heat treating oil and of 1.4 to 3.5 cst at 40° C. for use in an electrical discharge machining oil.

Some among the above base oils turn out to contain polycyclic aromatic compounds which serve to act as hydrogen donors. Experiments have confirmed, however, that such aromatic compounds are too small in content to attain hydrogen donation at a desirable level.

Hydrogenated pitches as components (b) according to the invention should importantly discharge sufficient hydrogen to capture carbonaceous matter or polymeric material which may emanate from the base oil at high temperature. Component (b) should also generate hydrogen to readily terminate the base oil against oxidative propagation in an oxidizing atmosphere.

The hydrogenated pitch or component (b) may be added in an amount of 0.1 to 20 parts by weight, preferably 1 to 15 parts by weight, more preferably 1 to 10 parts by weight, most preferably 2 to 8 parts by weight, based on 100 parts by weight of the base oil or component (a). To formulate the oil composition contemplated under the invention, component (b) should of course be selected, from its qualitative and quantitative standpoints, to impart to the ultimate composition various important qualities necessary as a lubricating oil, heat transfer oil, heat treating oil or electrical discharge machining oil.

Component (b) has now been found to be an oil fractionate generated from a hydrogenated pitch and distilled at from 160° to 550° C., which pitch is induced by primarily heat-treating and hydrogenating a heavy oil of a petroleum or coal origin. Alternatively, this component is an oil fractionate resulting from secondarily heat-treating the hydrogenated pitch and boiling at from 160° to 550° C.

Heavy oils of a petroleum origin for use in component (b) include heavy oil boiling at above 200° C. obtained by steam or catalytic cracking of petroleum oils, light cycle oil (LCO) and heavy cycle oil (HCO). Such heavy oil boiling at above 200° C. is made available from fractionates boiling at 200° to 450° C. byproduced in the manufacture of ethylene, propylene and other olefins by steam cracking of naphtha, kerosene or light oil usually at from 700° to 1,200° C. Another heavy oil (DCO) boiling at above 200° C. finds its source from fractionates boiling at 200° to 450° C. byproduced in the manufacture of gasoline and other light oils by catalytic cracking of kerosene, light oil or topped crude in the presence of a naturally occurring or synthetically available silica-alumina catalyst or a zeolite catalyst at from 450° to 550° C. and at from atmospheric to 20 kg/cm$^2$G.

Heavy oils of a coal origin also for use in component (b) include coal tar and its distillates such as creosote oil boiling at above 200° C.

The above heavy oils according to the invention are subjected to a primary heat treatment at from 350° to 480° C. preferably from 380° to 450° C., and at from 2 to 50 kg/cm$^2$, preferably from 5 to 40 kg/cm$^2$, for from 15 minutes to 20 hours. The resulting pitch softens usually at about 40° to 150° C. In that instance, if necessary, light oil fractions may be removed for example by distillation. The pitch is then hydrogenated in the presence of a suitable hydrogenation catalyst such as a catalyst composed of a catalyst component chosen from a Group IB metal such as copper, a Group VIB metal such as chromium or molybdenum, or a Group VIII metal such as cobalt, nickel, palladium or platinum in the form of a sulfide or oxide, and an inorganic carrier such as bauxite, active carbon, diatomaceous earth, zeolite, silica, titania, zirconia, alumina or silica gel.

Hydrogenation conditions, though varied with the type of catalyst used, are set usually at a temperature of 120° to 450° C., preferably 200° to 380° C. and at a pressure of 20 to 180 kg/cm$^2$G, preferably 40 to 150 kg/cm$^2$G, for a time length of 0.5 to 3 hours by batch operation, or at a liquid hourly space velocity (LHSV) of 0.1 to 3.0, preferably 0.2 to 1.5, by continuous operation.

The aromatic nuclei of the aromatic hydrocarbons in the heavy oil fraction are partially hydrogenated during reaction at a rate of 10 to 85%, preferably 20 to 70%. This hydrogenation rate is defined by the following equation in which the carbon number of aromatic rings is determined by ASTM D-2140-66.

$$R = \frac{A - B}{A}$$

R: rate of hydrogenation
A: carbon number of aromatic ring prior to hydrogenation
B: carbon number of aromatic ring after hydrogenation The resulting hydrogenated pitch usually has a softening point of 10° to 80° C. and can be used per se as component (b), or may preferably be further distilled to yield fractions boiling at 160° to 550° C., preferably 200° to 550° C., for use as component (b).

The pitch thus hydrogenated may be further subjected to a secondary treatment with heat to give fractions boiling at 160° to 550° C., preferably 200° to 550° C. The secondary heat treatment is effected by passing the hydrogenated pitch through gaseous or vaporous nitrogen, argon, helium, xenon or the like inert to the pitch in a vacuum of about 0.1 to 500 mmHg and at a temperature of 340° to 450° C., preferably 370° to 420° C. Treatment time lengths depend upon the temperature and rate of pitch passing through inert gas or vapor and upon other parameters, but range usually from 30 minutes to 50 hours, preferably from 1 to 40 hours. The flow rate of inert gas or vapor may be chosen according to the type of reactor employed.

The fractions to be used as component (b) are obtained from top distillates of the reactor during the secondary heat treatment or by further distillation of the heat-treated fractions. The pitch made available from such secondary treatment can be used as a starting material for fibrous carbon and the like.

Component (b) may be incorporated simultaneously with formulation of a given oil composition of the invention. It may if necessary be added subsequently by the user to a selected base oil after which the resulting composition is put to use.

The oil composition according to the invention may be further blended with a gelling agent or component (c) so that it is suitably applied as a grease. Suitable gelling agents are chosen from those commonly accepted for grease formation. Specific examples include urea-based compounds such as diurea, triurea, tetraurea and polyurea compounds, urea-urethane compounds, diurethane compounds and the like, metallic soaps such as calcium soaps, calcium complex soaps, sodium soaps, lithium soaps, aluminum soaps, aluminum complex soaps, barium complex soaps and the like, and other organic or inorganic compounds such as bentonites, silica gels, fluorine-based compounds, indanthrenes, phthalocyanines and the like.

Component (c) may be added in an amount of 2 to 50 parts by weight, preferably 3 to 30 parts by weight, based on 100 parts by weight of component (a).

In the case where the oil composition of the invention is used as a lubricating oil, various other additives may be employed in conventional manner. They include antioxidants, detergents-dispersants, viscosity index improvers, pour point depressants, oiliness improvers, antiwear agents, extreme pressure additives, corrosion inhibitors, metal inactivators, rust inhibitors, defoamers, emulsifiers, demulsifiers, disinfactants, colorants and the like. Details of these additives are disclosed for instance in J. Soc. Lubricants, Japan, Vol. 15, No. 6 and "Additives for Petroleum Products", T. Sakurai, Saiwai Publishing Co. Any one or more additives chosen may be used in a sum of not more than 20% by weight, preferably smaller than 15%, more preferably below 10%, based on the total weight of component (a).

Component (b) has now been found conspicuously effective when it is subjected to higher temperatures say at above 350° C. and even at 800° C. This component is preferred particularly for use in a lubricating oil which is usually locally exposed to elevated temperature.

The oil composition of the invention, therefore, is suitable as an engine oil for gasoline engines, land and marine diesel engines, aircraft engines and the like, as a turbine oil for gas turbines, marine turbines and the like, as a gear oil for automotive gears, industrial gears and the like, automatic transmission fluids and the like, as an industrial grease, as a hydraulic fluid, as a compressor oil, as a refrigerator oil, as a metal machining oil for cutting, grinding and the like, as a plastic molding oil, as a slide surface guiding oil, as a bearing oil, as a releasing agent and the like.

The oil composition of the invention for use as a spark machining fluid may be blended with those additives chosen from antioxidants, detergents-dispersants, rust inhibitors and polymeric materials such as ethylene-propylene copolymers and the like.

The oil composition of the invention when applied as a heat treating oil may be further incorporated with polishing improvers and cooling improvers. As cooling improvers oil-soluble polymers are used in which are included asphalt, polyvinyl chloride, polystyrene, acrylonitrile-styrene resin, polymethacrylate, polybutene, polyisobutylene, silicone resin, polyvinyl butyral and the like.

Thus the oil composition of the invention contributes greatly to machining by electrical discharge, quenching, annealing and tempering.

The oil composition contemplated under the invention is contrived also for use as a heat transfer oil. To this end several additives may be blended which are selected from antioxidants, detergents-dispersants, viscosity index improvers, pour point depressants, corrosion inhibitors, metal inactivators, rust inhibitors, defoamers, colorants and the like, details of which are found in the two reference publications referred to above. One or more selected additives may total to be not more than 10 parts by weight, preferably smaller than 5 parts, more preferably below 3 parts, per 100 parts by weight of component (a).

The following examples are given to further illustrate the invention. These examples should be regarded as illustrative rather than restrictive.

Inventive Example 1/Comparative Example 1

Performance evaluation of heat stability was made with a hydrogenated pitch or component (b) added in one run and omitted in another run.

As a base oil or component (a) an SAE-30 oil was used which was derived by hydrogenating Arabian crude oil. Component (b) was present in Inventive Example 1 and absent in Comparative Example 1.

Component (b) was prepared in the manner mentioned below.

A decanted oil (DCO) boiling at above 200° C. was derived by catalytically cracking a hydrogenated oil of a vacuum gas oil (VGO) generating from crude oil of Arabian origin. That cracking was done at 500° C. with use of a silica-alumina catalyst. The resultant heavy oil was thereafter subjected to a primary heat treatment 15 kg/cm$^2$G and at 400° C. for 3 hours, followed by distillation at 250° C. and at 1.0 mmHg to remove light oil fractions. There was obtained a pitch oil of 83° C. in softening point and 160° to 550° C. in boiling point.

Partial hydrogenation was effected by contacting the above pitch oil with hydrogen in the presence of a nickel-molybdenum catalyst (NM-502) at 135 kg/cm$^2$G, at 350° C. and at 0.25 LHSV. The resulting hydrogenated pitch was distilled at 250° C. and at 1.0 mmHg to thereby collect as component (b) a fraction boiling at from 160° to 550° C.

Inventive Example 1 had a content of component (b) of 10 parts by weight per 100 parts by weight of SAE-30. Comparative Example 1 contained SAE-30 alone. Each of the test oils was taken into a heat stability tester at its vessel 2 as shown in FIG. 1, followed by standing for 24 hours at 450° C. and at 2 kg/cm$^2$G in a nitrogen atmosphere. Deposits of carbonaceous matter were inspected and then toluene insolubles measured.

The control revealed carbonaceous deposition with a toluene insoluble of 5.9% by weight per base oil. The inventive composition is free from carbonaceous matter and acceptable in toluene insoluble as low as 0.40% by weight per base oil.

Designated at 1 in FIG. 1 is an electric furnace, at 2 a vessel, at 3 a sample, at 4 and 5 valves, at 6 a nitrogen gas and at 7 a thermometer.

Inventive Example 2/Comparative Example 2

Panel coking was tested with an oil composition of Inventive Example 1 and with an SAE-30 oil of Comparative Example 1.

Figure 2:
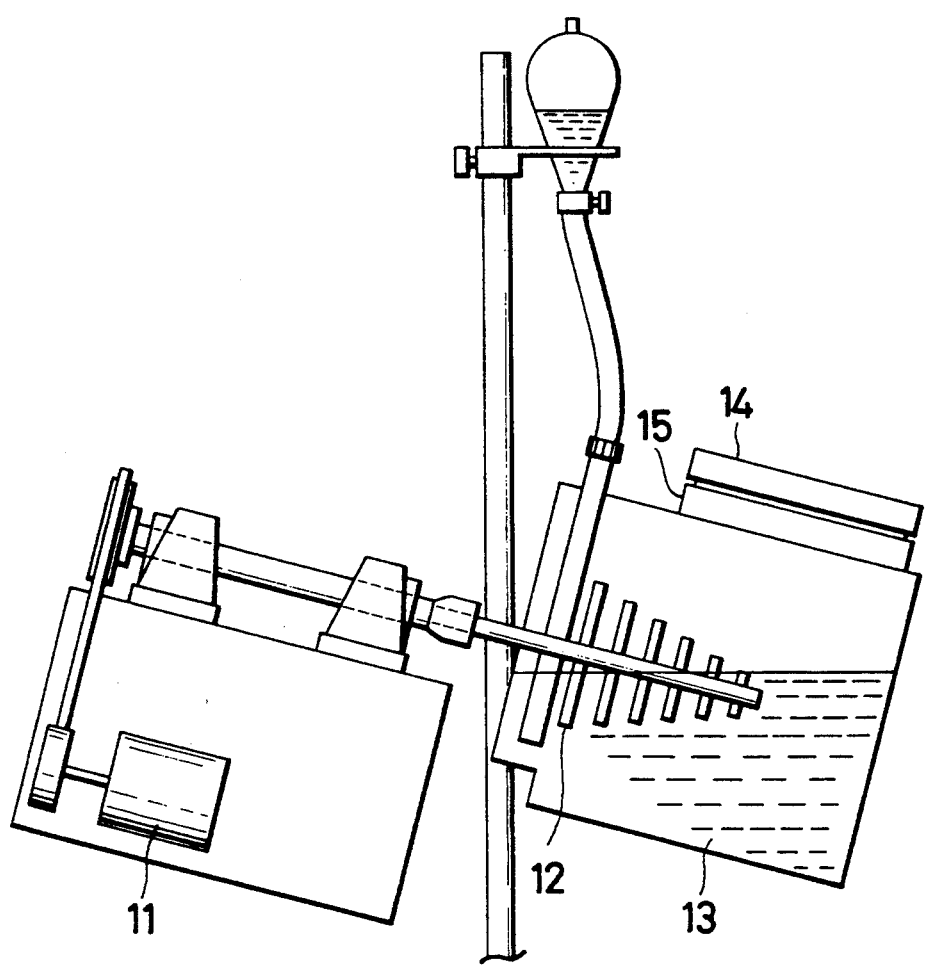

With a tester seen diagrammatically in FIG. 2, a test oil 13 held constant at a given temperature was caused to entrain upwardly and to adhere on to one surface of a panel heater 14 disposed upstream the tester. This entrainment was performed by means of a metallic stirring rod 12 arranged to rotate via a motor 11. Stability of the oil was adjudged by the state of coking in which the resulting oil film was allowed to fall slidably out of a metal surface 15 adjusted by the heater 14 in its temperature to a predetermined degree.

The tester used here, generally designed for use at about 300° C., was modified to suit higher temperatures. Determination was made under the conditions indicated in Table 1 and with the results shown in Table 2.

TABLE 1

| | |
|---|---|
| temperature: | 100° C. |
| entrainment: | cycle of 15-second operation and 45-second stop |
| panel surface temperature: | 390–400° C. |
| time: | 5 hours |

TABLE 2

| Run | Coaking |
|---|---|
| Inventive Example 2<br>100 parts of SAE-300 plus<br>10 parts of component (b)<br>or hydrogenated pitch | 0.50 wt. % |
| Comparative Example 2<br>SAE-300 alone | 5.8 wt. % |

Inventive Example 3/Comparative Example 3

The effects of component (b) on stability of electrical discharge machining oils were checked with an inventive oil composition in Inventive Example 3 as contrasted to a base oil alone in Comparative Example 3. The base oil used was kerosene hydrorefined.

Component (b) used in this example was prepared as described below.

A hydrogenated oil of VGO generating from crude oil Arabian origin was catalytically cracked at 500° C. in the presence of a silica-alumina catalyst, thereby giving DCO boiling at above 200° C. The resultant heavy oil was primarily heat-treated at 15 kg/cm$^2$G and at 400° C. for 3 hours and thereafter distilled at 250° C. and at 1.0 mmHg remove light oil fractions. A pitch oil was obtained which had a softening point of 83° C. and a boiling point of 160 to 550° C. A hydrogenated pitch was derived by partially hydrogenating the above pitch oil on contact with hydrogen in the presence of a nickel-molybdenum catalyst (NM-502) at 95 kg/cm$^2$G, at 280° C. and at 0.4 LHSV.

Subsequently, a secondary heat treatment of the hydrogenated pitch was carried out with stirring in a stream of nitrogen at 380° C. for 20 hours. A heavy oil fraction distilled together with gaseous nitrogen at from 200° to 400° C. was collected as component (b).

Figure 3:
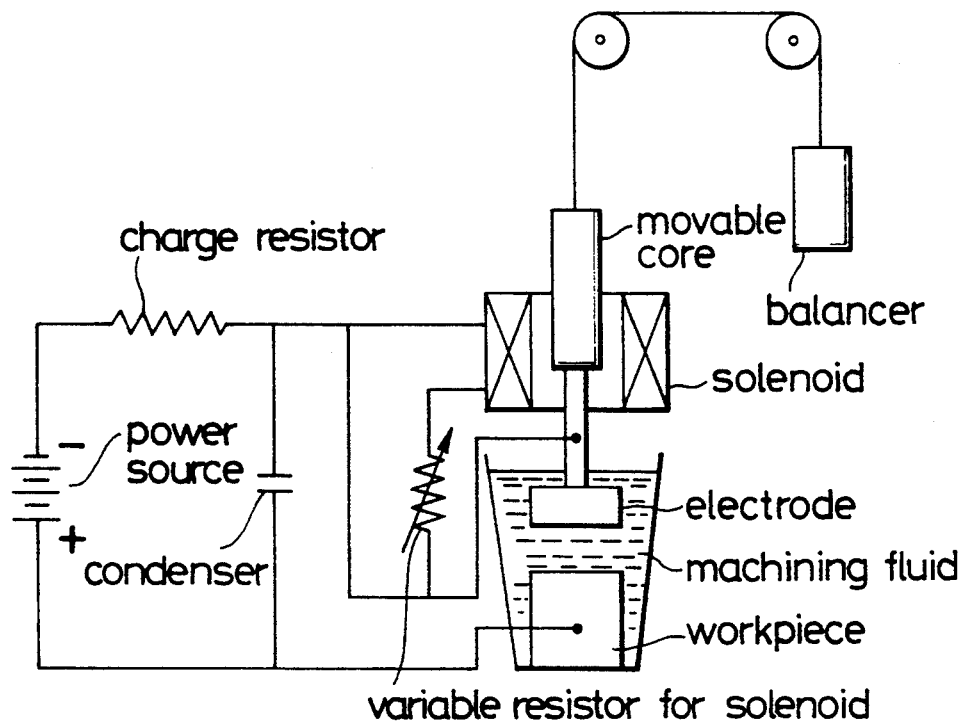

Deep boring was done under the conditions shown in Table 3 and with the use of an electrical discharge machining apparatus illustrated in FIG. 3. Inventive Example 3 was formulated with 15 parts by weight of component (b) added per 100 parts by weight of kerosene as a base oil. Comparative Example 3 was kerosene alone used.

Upon completion of the machining, the test fluids were subjected to naked inspection to see carbonaceous deposits and further to determination of toluene insolubles with the results shown in Table 4.

As is evidenced by the test results, component (b) has been proved highly effective in reducing carbonaceous matter in the electrical discharge machining oil.

TABLE 3

| electrode polarity: | (+) |
|---|---|
| average voltage: | 75–82 V |
| average current: | 5.6 A |
| machining time: | 1,200 minutes |
| electrode: | Cu |
| workpiece: | SKP 11 |
| fluid quantity: | 90 liters |

TABLE 4

| Run | Deposit | Toluene Insoluble |
|---|---|---|
| Inventive Example 3 | No | 0.5 wt. % |
| Comparative Example 3 | Yes | 8.0 wt. % |

Inventive Example 4/Comparative Example 4

Evaluation was made of the effects of component (b) on a lithium soap-based grease for industrial use.

A base oil was a mineral oil of 100 cst in viscosity at 40° C. Inventive Example 4 was composed of 30 parts by weight of a lithium soap as a gelling agent and 10 parts by weight of component (b) described later, each such amount being based on 100 parts by weight of the base oil. Comparative Example 4 was likewise prepared except that component (b) was omitted.

Component (b) tested in this example was prepared in the following manner.

Naphtha was steam-cracked at 830° C. to derive a fractionate boiling at above 200° C. The resulting heavy oil was then heat-treated primarily at 15 kg/cm$^2$G and at 400° C. for 3 hours, followed by distillation at 250° C. and at 1.0 mmHg to thereby remove light oil fractions. A pitch oil was yielded which was determined to soften at 83° C. and to boil at from 250° to 550° C. To generate a hydrogenated pitch, the above pitch oil was partially hydrogenated by contact with hydrogen at 135 kg/cm$^2$G, at 350° C. and at 0.25 LHSV in the presence of a nickel-molybdenum catalyst (NM-502).

The hydrogenated pitch thus obtained was secondarily heat-treated with stirring in a stream of nitrogen at 380° C. for 20 hours. A heavy oil fraction distilled at from 250° to 550° C. together with gaseous nitrogen was collected as component (b).

The resulting grease in a cylindrical form of 40 mm in diameter and 3 mm in thickness was left in a temperature-constant, air-present chamber at 130° C. Appearance changes with time were inspected and carbonyl absorbances measured with the results shown in Table 5. The carbonyl absorbance was taken as a measure of oxidation.

Component (b) according to the invention has a role to remarkably inhibit the grease from becoming oxidized as appears clear from the tabulated data. The inventive grease is sufficiently fluidless even on lapse of 11 days at 130° C.

TABLE 5

| | Days after Oxidation | | | | | | | |
|---|---|---|---|---|---|---|---|---|
| | 3 | | 5 | | 10 | | 11 | |
| Run | appearance | CO absorbance | appearance | CO absorbance | appearance | CO absorbance | appearance | CO absorbance |
| Comparative Example 4 | reddish brown | 0.16 | thick brown | 0.36 | blackish brown | 1.70 | blackish brown | 1.86 |
| component (b) not added | fluidless | | fluidless | | fluid | | highly fluid | |
| Inventive Example 4 | brown | 0.09 | blackish brown | 0.20 | blackish brown | 0.33 | blackish brown | 0.45 |
| component (b) added | fluidless | | fluidless | | fluidless | | fluidless | |

The oil composition according to the invention has the following characteristics.

1) Substantially free from thermal deterioration and carbonaceous deposition at high temperature.
2) Sufficiently undeteriorative in oxidizing atmosphere.
3) Good resistance to oxidative deterioration when in use as an industrial grease.
4) Least carbonaceous matter when in use for electrical discharge machining.

This means that the oil composition has good acceptability as a lubricating oil, heat transfer oil, heat treating oil or electrical discharge machining oil.

We claim:

1. An oil composition comprising:
   (a) 100 parts by weight of a base oil selected from the group consisting of a mineral base oil, a synthetic base oil and a mixture thereof; and
   (b) 0.1 to 20 parts by weight of an oil fraction having a boiling point ranging from 160° C. to 550° C., said oil fraction being selected from the group consisting of (i) a hydrogenated pitch produced by primarily heat-treating and hydrogenating a heavy oil of petroleum origin, said primarily heat-treating being conducted under a temperature of 350° C. to 480° C. and a pressure of 2 to 50 kg/cm$^2$ for 15 minutes to 20 hours, and said hydrogenating being conducted in the presence of a hydrogenating catalyst under a temperature of 120° C. to 450° C. and a pressure of 20 to 180 kg/cm$^2$-gauge for a period sufficient to attain a hydrogenation rate of the aromatic nuclei of the aromatic hydrocarbons of 10% to 85%, (ii) an oil obtained by secondarily heat-treating said hydrogenated pitch in an atmosphere of gas inert to the hydrogenated pitch at a temperature of 340° C. to 450° C. under an atmospheric or reduced pressure, and (iii) a mixture of (i) and (ii).

2. An oil composition according to claim 1; wherein said mineral base oil comprises a refining oil obtained by subjecting an atmospheric or vacuum distillate to a treatment selected from the group consisting of solvent deasphalting, solvent extraction, solvent dewaxing, hydrocracking, hydrorefining, sulfuric acid treatment, clay treatment and combinations thereof.

3. An oil composition according to claim 1; wherein said synthetic base oil is selected from the group consisting of alpha-olefin oligomers, alkylbenzenes, alkylnaphthalenes, diesters, polyol esters, polyglycols, polyphenyl esters, tricresyl phosphates, silicone oils and mixtures thereof.

4. An oil composition according to claim 1; wherein said heavy oil of petroleum origin is selected from the group consisting of light cycle oil, heavy cycle oil and an oil boiling at above 200° C. obtained by steam or catalytic cracking of petroleum oil.

5. An oil composition according to claim 1; wherein said hydrogenating catalyst is composed of at least one metal selected from Groups IB, VIB and VIII deposited on an inorganic carrier material.

6. A grease composition comprising:
   (a) 100 parts by weight of a base oil selected from the group consisting of a mineral base oil, a synthetic base oil and a mixture thereof;
   (b) 0.1 to 20 parts by weight of an oil fraction having a boiling point ranging from 160° C. to 550° C., said oil fraction being selected from the group consisting of (i) a hydrogenated pitch produced by primarily heat-treating and hydrogenating a heavy oil of petroleum origin, said primarily heat-treating being conducted under a temperature of 350° C. to 480° C. and a pressure of 2 to 50 kg/cm$^2$ for 15 minutes to 20 hours, and said hydrogenating being conducted in the presence of a hydrogenating catalyst under a temperature of 120° C. to 450° C. and a pressure of 20 to 180 kg/cm$^2$-gauge for a period sufficient to attain a hydrogenation rate of the aromatic nuclei of the aromatic hydrocarbons of 10% to 85%, (ii) an oil obtained by secondarily heat-treating said hydrogenated pitch in an atmosphere of gas inert to the hydrogenated pitch at a temperature of 340° C. to 450° C. under an atmospheric or reduced pressure, and (iii) a mixture of (i) and (ii); and
   (c) a gelling agent selected from the group consisting of diurea compounds, triurea compounds, tetraurea compounds, polyurea compounds, urea-urethane compounds, diurethane compounds, calcium soaps, calcium complex soaps, sodium soaps, lithium soaps, aluminum soaps, aluminum complex soaps, barium complex soaps, bentonites, silica gels, indanthrenes, phthalocyanines, and mixtures thereof in an amount of 2 to 50 parts by weight per 100 parts by weight of said base oil.

7. A grease composition according to claim 6; wherein said mineral base oil comprises a refining oil obtained by subjecting an atmospheric or vacuum distillate to a treatment selected from the group consisting of solvent deasphalting, solvent extraction, solvent dewaxing, hydrocracking, hydrorefining, sulfuric acid treatment, clay treatment and combinations thereof.

8. A grease composition according to claim 6; wherein said synthetic base oil is selected from the group consisting of alpha-olefin oligomers, alkylbenzenes, alkynaphthalenes, diesters, polyol esters, polyglycols, polyphenyl esters, tricresyl phosphates, silicone oils and mixtures thereof.

9. A grease composition according to claim 6; wherein said heavy oil of petroleum origin is selected from the group consisting of light cycle oil, heavy cycle oil and an oil boiling at above 200° C. obtained by steam or catalytic cracking of petroleum oil.

10. A grease composition according to claim 6; wherein said hydrogenating catalyst is composed of at least one metal selected from Groups IB, VIB and VIII deposited on an inorganic carrier material.

* * * * *